(No Model.)
A. H. SWAIN.
POST HOLE AUGER.
No. 269,895. Patented Jan. 2, 1883.
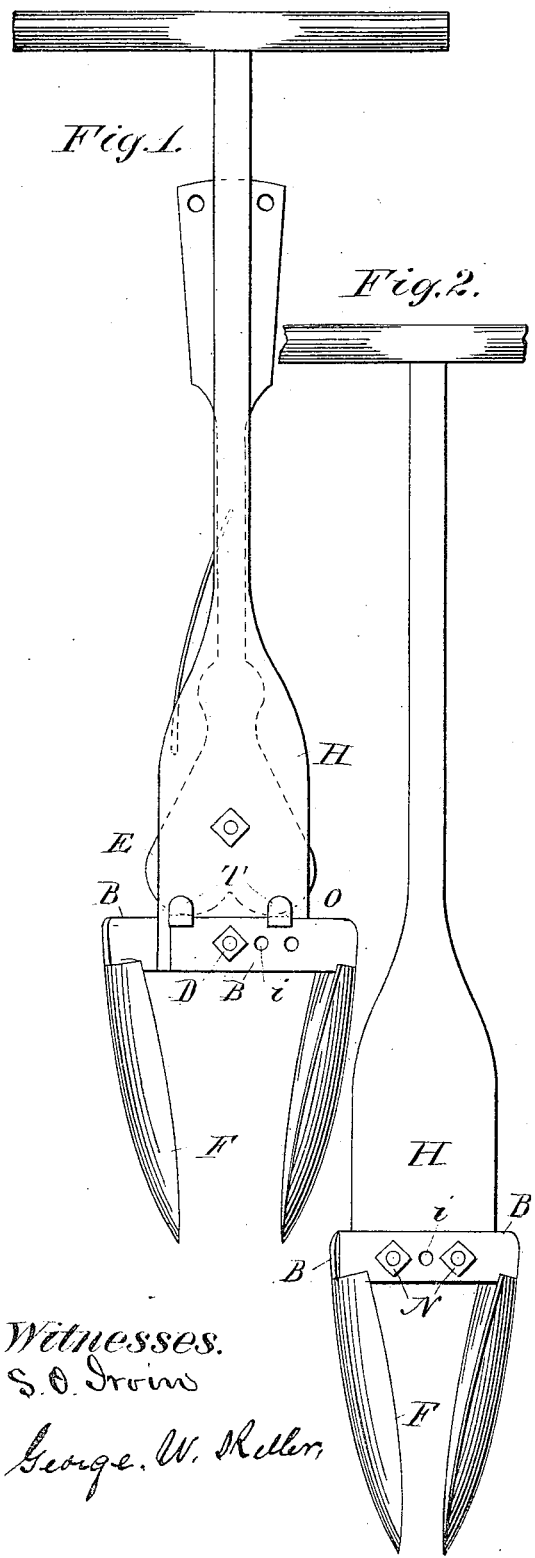
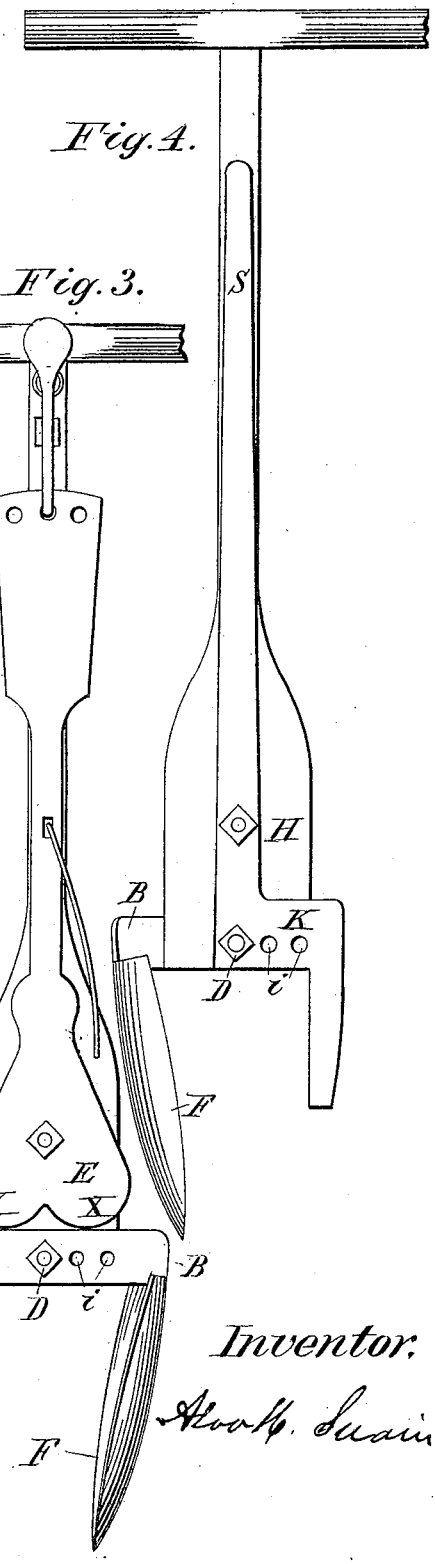
Witnesses.
S. O. Irvins
George. W. Keller
Inventor.
A. H. Swain

UNITED STATES PATENT OFFICE.

ALVA H. SWAIN, OF WINCHESTER, INDIANA.

POST-HOLE AUGER.

SPECIFICATION forming part of Letters Patent No. 269,895, dated January 2, 1883.

Application filed September 1, 1882. (No model.)

To all whom it may concern:

Be it known that I, ALVA H. SWAIN, of Winchester, in the county of Randolph and State of Indiana, have invented a new and useful Improvement in Earth or Post-Hole Augers, which improvement is fully set forth in the following specification, reference being had to the accompanying drawings.

My invention relates to an improvement in post-hole augers, and the object of it is to so construct as to be able to adjust them to bore different-sized holes and to be conveniently unloaded, they being made, substantially as described, with two concavo-convex shovels or bits, say, five inches wide each and nine inches long, (for holes from six to ten inches in diameter,) with the edges sloping toward the center of the lower end, that will cut their way into the earth when revolved upon their points. The said shovels are fastened to shanks with arms or lugs, in each of which there are a series of holes, through which the said arms or lugs are bolted, on opposite sides of a broad flat stem or head, in such a manner that the shovels will stand approximately opposite each other, forming a circular chamber, into which the earth is collected as the shovels penetrate the earth, the said chamber being larger at the top than at the bottom, there being openings between the edges of the shovels to unload through (when the soil is in the most favorable condition) without spreading shovels apart. On one side of the head or stem are studs, that form stays or bearings for the upper edge of the arm or lug on that side, the same being held rigid by the said studs or projections and the bolt that holds the arms to the head. The arm on the opposite side of the head is held in position by the same bolt and a levered cam, by which the said arm may be held rigid while boring, or oscillated at will by the use of the said levered cam, which may be used to spread the shovels apart for unloading when desired. The lever may be fastened to top part of main stem or released at will. My invention also contemplates (when desired) the use of a continuous arm and lever instead of the levered cam, all of which will be better understood by reference to drawings herewith.

Figure 1 is a view of auger with the arm or lug in view that is held rigid by the studs or projections and a bolt. Fig. 3 shows the same construction with the arm or lug in view that is held in position or oscillated at will by the use of the levered cam. Fig. 4 is the same as Fig. 3 with one shovel removed, and in the place of the levered cam a continuous or combined arm and lever bolted to head at the same point that the arm or lug is, as seen in Fig. 3. Fig. 2 is a view of one side of a construction wherein the arms or lugs are bolted to the head by two bolts, both being held rigid thereby, the arm in view being an exact representation of its fellow.

H is a broad flat stem or head, to which are bolted arms or lugs B B, one of which is held rigid by bolt D and bearings O O, formed by the studs or projections T T, as seen in Fig. 1, the other being held rigidly in position or oscillated at will by the use of the levered cam X X E, (see Fig. 3,) by the use of which the operator is enabled to spread apart the shovels F F for unloading.

I I are a series of holes used in bolting arms or lugs B B to head H, and adjusting shovels F F for boring larger or smaller holes.

S K is a continuous arm and lever, as seen in Fig. 4, in place of the levered cam X X E. N N are bolts that hold both arms B B to head H, one side of which is seen in Fig. 2.

I do not broadly claim as my invention a post-hole auger with arms or lugs bolted to a head or stem; but What I do claim as my invention and desire to secure by Letters Patent, is—

The combination, in a post-hole auger, of a broad flat stem, head, or center piece, H, having studs or projections T T, with adjustable arms B B, bolt D, levered cam X X E, and shovels F F, all substantially as set forth.

ALVA H. SWAIN.

Witnesses:
S. O. IRVIN,
GEO. W. KELLER.